(12) United States Patent
Filippov et al.

(10) Patent No.: US 12,720,111 B2
(45) **Date of Patent: *Aug. 25, 2026**

(54) METHOD AND APPARATUS FOR ADAPTIVELY PROCESSING VIDEO SAMPLES IN A VIDEO SIGNAL FRAME

(71) Applicant: HUAWEI TECHNOLOGIES CO., LTD., Shenzhen (CN)

(72) Inventors: Alexey Konstantinovich Filippov, Moscow (RU); Vasily Alexeevich Rufitskiy, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 119 days.

This patent is subject to a terminal disclaimer.

(21) Appl. No.: 18/778,443

(22) Filed: Jul. 19, 2024

(65) Prior Publication Data

US 2025/0047904 A1 Feb. 6, 2025

Related U.S. Application Data

(63) Continuation of application No. 18/359,226, filed on Jul. 26, 2023, now Pat. No. 12,081,800, which is a (Continued)

(51) Int. Cl.

| | |
|---|---|
| ***H04N 19/65*** | (2014.01) |
| ***H04N 19/117*** | (2014.01) |
| ***H04N 19/14*** | (2014.01) |
| ***H04N 19/147*** | (2014.01) |
| ***H04N 19/172*** | (2014.01) |

(Continued)

(52) U.S. Cl.

CPC .......... *H04N 19/65* (2014.11); *H04N 19/117* (2014.11); *H04N 19/14* (2014.11); *H04N 19/147* (2014.11); *H04N 19/172* (2014.11); *H04N 19/182* (2014.11); *H04N 19/198* (2014.11); *H04N 19/82* (2014.11)

(58) Field of Classification Search

CPC .... H04N 19/117; H04N 19/14; H04N 19/147; H04N 19/172; H04N 19/182; H04N 19/198; H04N 19/65; H04N 19/82

USPC .................................................... 375/240.02

See application file for complete search history.

(56) References Cited

U.S. PATENT DOCUMENTS

| | | | | |
|---|---|---|---|---|
| 9,955,152 | B2 | 4/2018 | Matsunobu et al. | |
| 10,694,212 | B2 * | 6/2020 | Filippov | H04N 19/82 |

(Continued)

OTHER PUBLICATIONS

Fu et al., Sample Adaptive Offset in the HEVC Standard, 2012, IEEE Transactions on Circuits and Systems for Video Technology, vol. 22, No. 12, pp. 1755-1764. (Year: 2012).*

(Continued)

*Primary Examiner* — Kathleen M Walsh
(74) *Attorney, Agent, or Firm* — Rimon PC

(57) ABSTRACT

A method and apparatus for adaptively processing video samples in a video signal frame, the video samples being arranged in a Largest Coding Unit. The method comprises extracting a plurality of video samples from the Largest Coding Unit, calculating a correction offset for a first video sample of the extracted plurality of video samples upon the basis of a first value of the first video sample and a second value of a second video sample of the extracted plurality of video samples, and weighting the first video sample with the correction offset.

20 Claims, 18 Drawing Sheets

Related U.S. Application Data continuation of application No. 17/707,354, filed on Mar. 29, 2022, now Pat. No. 11,758,192, which is a continuation of application No. 16/871,247, filed on May 11, 2020, now Pat. No. 11,303,934, which is a continuation of application No. 14/950,742, filed on Nov. 24, 2015, now Pat. No. 10,694,212, which is a continuation of application No. PCT/RU2013/000443, filed on May 30, 2013.

(51) Int. Cl.

| | |
|---|---|
| ***H04N 19/182*** | (2014.01) |
| ***H04N 19/196*** | (2014.01) |
| ***H04N 19/82*** | (2014.01) |

(56) References Cited

U.S. PATENT DOCUMENTS

| | | | | |
|---|---|---|---|---|
| 11,303,934 | B2 * | 4/2022 | Filippov | H04N 19/14 |
| 11,758,192 | B2 * | 9/2023 | Filippov | H04N 19/14 375/240.02 |
| 12,081,800 | B2 * | 9/2024 | Filippov | H04N 19/172 |
| 2012/0177103 | A1 | 7/2012 | Fu et al. | |
| 2012/0287988 | A1 | 11/2012 | Chong et al. | |
| 2013/0114678 | A1 | 5/2013 | Baylon et al. | |
| 2013/0177068 | A1 * | 7/2013 | Minoo | H04N 19/117 375/240.02 |
| 2013/0223517 | A1 | 8/2013 | Matsunobu et al. | |
| 2013/0251046 | A1 * | 9/2013 | Matsunobu | H04N 19/117 375/240.24 |
| 2013/0308696 | A1 | 11/2013 | Kim et al. | |
| 2014/0140416 | A1 | 5/2014 | Yamazaki et al. | |
| 2014/0314141 | A1 | 10/2014 | Choi et al. | |
| 2015/0071340 | A1 | 3/2015 | Andersson et al. | |

OTHER PUBLICATIONS

Benjamin Bross, et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Jan. 14-23, 2013, 310 pages.

Peter List, et al., "Adaptive Deblocking Filter", IEEE Transactions on Circuits and Systems for Video Technology, vol. 13, No. 7, Jul. 2003, p. 614-619.

Chih-Ming Fu, et al., "Sample Adaptive Offset for HEVC", IEEE, 2011, 5 pages.

Chih-Ming Fu, et al., "Sample Adaptive Offset in the HEVC Standard", IEEE Transactions on Circuits and Systems for Video Technology, vol. 22, No. 12, Dec. 2012, p. 1755-1764.

"Adaptive Loop Filter for Improving Coding Efficiency", Toshiba, Telecommunication Standardization Sector, Apr. 2008, 3 pages.

"Adaptive (Wiener) Filter for Video Compression", Intel, Telecommunication Standardization Sector, Apr. 2008, 7 pages.

Guillaume Laroche, et al., "Non SC34: On Interlayer SAO filtering in SHVC", Joint Collaborative Team on Video Coding (JCT-VC) of ITU-T SG 16WP 3 and ISO/IEC JTC 1/SC 29/WG 11, Apr. 18-26, 2013, 7 pages.

Elena Alshina, et al., "Non-CE8: Sample adaptive offset with constrained ranges of edge offset", Joint Collaborative Team on Video Coding (JCT-VC) of ITU-T SG 6 WP3 and ISO/IEC JTC1/SC29/WG11, Feb. 1-10, 2012, 15 pages.

Gisle Bjontegaard, "Improvements of the BD-PSNR model", ITU-Telecommunications Standardization Sector Study Group 16 Question 6, Jul. 16-18, 2008, 2 pages.

Ken Mccann, et al., "Samsung's Response to the Call for Proposals on Video Compression Technology", Joint Collaborative Team on Video Coding (JCT-VC) of ITU-T SG16 WP3 and ISO/IEC JTC1/SC29/WG 11, Apr. 15-23, 2010, 40 pages.

A. Fuldseth, et al., "Non-CE8.a.2 SAO with LCU-based syntax", Cisco Systems, Joint Collaborative Team on Video Coding (JCT-VC) of ITU-T SG 6 WP3 and ISO/IEC JTC1/SC29/WG11, Feb. 1-10, 2012, 4 pages.

Yu-Wen Huang, et al., "In-Loop Adaptive Restoration", MediaTek Inc., Joint Collaborative Team on Video Coding (JCT-VC) of ITU-T SG16 WP3 and ISO/IEC JTC1/SC29/WG11, Jul. 21-28, 2010, 11 pages.

Chih-Ming Fu, et al., "CE8.a.3: SAO with LCU-based syntax", MediaTek Inc., et al., Joint Collaborative Team on Video Coding (JCT-VC) of ITU-T SG16 WP3 and ISO/IEC JTC1/SC29/WG11, Feb. 1-10, 2012, 8 pages.

Frank Bossen, "Common test conditions and software reference configurations", JCT-VC, Joint Collaborative Team on Video Coding (JCT-VC) of ITU-T SG16 WP3 and ISO/IEC JTC1/SC29/WG11, Oct. 10-19, 2012, 3 pages.

Kenneth Anderson, "SAO simplification", Ericsson, Joint Collaborative Team on Video Coding (JCT-VC) of ITU-T SG16 WP3 and ISO/IEC JTC1/SC29/WG11, Apr. 27-May 7, 2012, 5 pages.

Alexey Filippov, et al., "Non-SCE3.3: Inter-layer interpolation-based SAO filtering for SHVC", Huawei Technologies, Joint Collaborative Team on Video Coding (JCT-VC) of ITU-T SG 16 WP 3 and 1S0/IEC JTC 1/SC 29/WG 11, Jul. 25-Aug. 2, 2013, 6 pages.

Gary J. Sullivan, et al., "Overview of the High Efficiency Video Coding (HEVC) Standard", IEEE Transactions on Circuits and Systems for Video Technology, vol. 22, No. 12, Dec. 2012, p. 1649-1668.

Kyeong Ho Yang, et al., "Real Time Implementation of Rate-distortion Optimized Coding Mode Selection for H.263 Video Coders", IEEE, 1998, p. 387-390.

Andersson et al., AHG 6: SAO simplification, 2012, Ericsson, Joint Collaborative Team on Video Coding (JCT-VC) of ITU-T SG 16 WP 3 and ISO/IEC JTC 1/SC 29/WG 11 pp. 1-5. (Year: 2012).

Andersson et al., AHG 6: SAO simplification,2012, Ericsson, Joint Collaborative Team on Video Coding (JCT-VC) of ITU-T SG 16 WP 3 and ISO/IEC JTC 1/SC 29/WG 11 pp. 1-5.

* cited by examiner

<table>
<tr><th>Category</th><th>Condition</th></tr>
<tr><td>1</td><td>c < a && c < b</td></tr>
<tr><td>2</td><td>( c < a && c==b) ||(c == a && c < b)</td></tr>
<tr><td>3</td><td>( c > a && c==b) ||(c == a && c > b)</td></tr>
<tr><td>4</td><td>c > a && c > b</td></tr>
<tr><td>0</td><td>None of the above</td></tr>
</table>

METHOD AND APPARATUS FOR ADAPTIVELY PROCESSING VIDEO SAMPLES IN A VIDEO SIGNAL FRAME

CROSS-REFERENCE TO RELATED APPLICATIONS

This application is a continuation of U.S. patent application Ser. No. 18/359,226, filed on Jul. 26, 2023, which is a continuation of U.S. patent application Ser. No. 17/707,354, filed on Mar. 29, 2022, now U.S. Pat. No. 11,758,192, which is a continuation of U.S. patent application Ser. No. 16/871,247, filed on May 11, 2020, now U.S. Pat. No. 11,303,934, which is a continuation of U.S. patent application Ser. No. 14/950,742, filed on Nov. 24, 2015, now U.S. Pat. No. 10,694,212, which is a continuation of International Application No. PCT/RU2013/000443, filed on May 30, 2013. All of the afore-mentioned patent applications are hereby incorporated by reference in their entireties.

TECHNICAL FIELD

The invention relates to the field of video signal processing.

BACKGROUND

Lossy compression methods for still images, pictures or video signal frames usually cause distortion of the still image, the picture or the video signal frame. This means that there may be a difference between the values of corresponding pixels or video samples in a source signal and a reconstructed signal. The difference between the values of corresponding pixels or video samples in a source and a reconstructed signal is usually denoted as error.

In many standardized video codecs, e.g. H.264/AVC and H.265/HEVC, there are two main sources of distortion: the quantization, wherein the quantization strength may be defined by a quantization parameter (QP), and the in-loop adaptive deblocking filter (ADF).

The error between the values of corresponding pixels or video samples in a source signal and a reconstructed signal are usually compensated using two mechanisms: decreasing the value of the quantization parameter and the negative impact of the in-loop adaptive deblocking filter on error values of pixels or video samples located in near-boundary regions, and directly compensating for the errors.

For emerging video coding standards, e.g. high efficiency video coding (HEVC), two methods for direct compensation of the errors are proposed. The first one is called sample adaptive offset (SAO), and the second one is called adaptive loop filter (ALF).

In the case of SAO, if the magnitude of a pixel or video sample after applying an SAO offset is not restricted, artifacts caused by impulse noise, e.g. salt and pepper noise, can result.

The main reason of appearing noise of such kind is that the difference between the magnitude of a pixel or video sample under consideration and its neighboring pixels or video samples is too high. In order to alleviate this problem, video coding standards, e.g. the H.265/HEVC standard, constrain the maximum absolute value that can be assigned to offsets. Therefore, the potentially achievable coding gain is limited. Hence, it is a problem how to avoid impulse noise without a loss in the coding gain.

In P. List, A. Joch, J. Lainema, G. Bjøntegaard, M. Karczewicz, "Adaptive Deblocking Filter", IEEE Transactions on Circuits and Systems for Video Technology, Vol. 13, No. 7, July 2003, pp. 614-619, pixel or video sample classification using 1-dimensional patterns is performed.

In K. McCann, W.-J. Han, I.-K. Kim, J.-H. Min, E. Alshina, A. Alshin, T. Lee, J. Chen, V. Seregin, S. Lee, Y.-M. Hong, M.-S. Cheon, N. Shlyakhov, "Samsung's Response to the Call for Proposals on Video Compression Technology", Contribution to JCT-VC meeting, JCTVC-A124, Dresden, April 2010, the method of extreme correction is described. This method uses a set of pre-defined 2-dimensional patterns in order to classify pixels or video samples of the reconstructed image.

In A. Fuldseth, G. Bjøntegaard, "SAO with LCU-based syntax", Cisco's contribution to JCT-VC meeting, JCTVC-H0067, San Jose, February 2012, it is proposed not to encode offset magnitudes but to fix their values to either 1 or −1 depending on the category.

SUMMARY

It is the object of the invention to provide an improved method for directly compensating errors in video signal frames.

This object is achieved by the features of the independent claims. Further implementation forms are apparent from the dependent claims, the description and the figures.

The invention is based on the finding that each video sample in the video signal frame can be processed adaptively.

According to a first aspect, the invention relates to a method for adaptively processing video samples in a video signal frame, the video samples being arranged in a Largest Coding Unit, the method comprising: extracting a plurality of video samples from the Largest Coding Unit; calculating a correction offset for a first video sample of the extracted plurality of video samples upon the basis of a first value of the first video sample and a second value of a second video sample of the extracted plurality of video samples; and weighting the first video sample with the correction offset. Thus, an improved compensation of errors in video signal frames can be achieved.

The video signal frame can represent a video signal at a fixed time instant. The video signal frame can comprise a still image or a picture.

The video samples can be characterized by a 2-dimensional coordinate. The video samples can further be characterized by a colour space, e.g. a greyscale colour space or a red green blue (RGB) colour space.

The value of a video sample can be a number, e.g. 20, 45 or 236. The value of a video sample can also relate to a colour channel of a colour space, e.g. the red colour channel of the red green blue (RGB) colour space.

The Largest Coding Unit (LCU) can comprise a Coding Tree Unit (CTU). The shape of the Largest Coding Unit can be square, e.g. 16×16 video samples or 64×64 video samples, or rectangular, e.g. 8×16 video samples or 64×32 video samples.

In a first implementation form of the method according to the first aspect, the method further comprises: assigning an edge offset class to the extracted plurality of video samples, the edge offset class indicating a directional pattern of the extracted plurality of video samples; and selecting an edge offset category from a plurality of edge offset categories for the extracted plurality of video samples, the edge offset category characterizing an alignment of the extracted video samples with respect to each other, the plurality of edge offset categories being assigned to the edge offset class.

Thus, the method can be performed using an optimized edge offset class and/or an optimized edge offset category.

The edge offset (EO) class can indicate a directional pattern of the extracted plurality of video samples. The edge offset class can be assigned prior to extracting the plurality of video samples from the Largest Coding Unit.

The edge offset (EO) category can characterize an alignment of the extracted video samples with respect to each other. The edge offset category can be selected after extracting the plurality of video samples from the Largest Coding Unit.

In a second implementation form of the method according to the first implementation form of the method, the edge offset class indicates a horizontal directional pattern, a vertical directional pattern, or a diagonal directional pattern. Thus, the method can exploit directional properties of the video signal frame.

The horizontal directional pattern can be characterized by a fixed vertical coordinate or a fixed y-coordinate of the extracted plurality of video samples.

The vertical directional pattern can be characterized by a fixed horizontal coordinate or a fixed x-coordinate of the extracted plurality of video samples.

The diagonal directional pattern can be characterized by a linear relationship between the horizontal coordinate or x-coordinate and the vertical coordinate or y-coordinate of the extracted plurality of video samples. The diagonal directional pattern can exhibit a non-zero angle relative to the horizontal coordinate axis or x-coordinate axis, e.g. an angle of 135° or 45°.

In a third implementation form of the method according to the first implementation form of the method or the second implementation form of the method, the edge offset category characterizes a local valley alignment, a local peak alignment, a concave corner alignment, a convex corner alignment, or a remaining alignment of the extracted video samples with respect to each other. Thus, the method can exploit alignment properties of the extracted video samples with respect to each other.

The alignment of the extracted video samples can comprise the alignment of the values of the extracted video samples.

The local valley alignment can be characterized by a local minimum of the first value of the first video sample relative to further values of further extracted video samples.

The local peak alignment can be characterized by a local maximum of the first value of the first video sample relative to further values of further extracted video samples.

The concave corner alignment can be characterized by a minimum of the first value of the first video sample and a second value of a second video sample relative to further values of further extracted video samples. The first value of the first video sample and the second value of the second video sample can be equal.

The convex corner alignment can be characterized by a maximum of the first value of the first video sample and a second value of a second video sample relative to further values of further extracted video samples. The first value of the first video sample and the second value of the second video sample can be equal.

The remaining alignment can be characterized by any alignment which differs from the local valley alignment, the local peak alignment, the concave corner alignment, and the convex corner alignment.

In a fourth implementation form of the method according to the first implementation form of the method, the second implementation form of the method or the third implementation form of the method, the edge offset class is assigned by a rate distortion optimization procedure or the edge offset category is selected by a rate distortion optimization procedure, the rate distortion optimization procedure using a distortion look-up table for assigning the edge offset class or selecting the edge offset category. Thus, an optimized assignment of the edge offset class and an optimized selection of the edge offset category can be achieved.

The rate distortion optimization (RDO) procedure can perform an optimization between the rate of a video signal and the distortion of a video signal. The rate distortion optimization procedure can assign an edge offset class. The rate distortion optimization procedure can further select an edge offset category.

The distortion look-up table (distortion LUT) can be used by the rate distortion optimization procedure in order to assign an edge offset class and/or to select an edge offset category.

In a fifth implementation form of the method according to the first aspect as such or any of the preceding implementation forms of the first aspect, weighting the first video sample with the correction offset comprises adding the correction offset to the first value of the first video sample, or subtracting the correction offset from the first value of the first video sample. Thus, an efficient weighing of the first video sample with the correction offset can be achieved.

In a sixth implementation form of the method according to the first aspect as such or any of the preceding implementation forms of the first aspect, extracting the plurality of video samples from the Largest Coding Unit comprises extracting a plurality of adjacent video samples from the Largest Coding Unit. Thus, the method can exploit the properties of closely located video samples.

Adjacent video samples can be characterized by each video sample having at least one neighboring video sample.

In a seventh implementation form of the method according to the first aspect as such or any of the preceding implementation forms of the first aspect, the extracted plurality of video samples comprises an odd number of video samples, in particular 3 video samples. Thus, the first video sample can be centred with respect to the further video samples of the extracted plurality of video samples.

In an eighth implementation form of the method according to the first aspect as such or any of the preceding implementation forms of the first aspect, the correction offset for the first video sample of the extracted plurality of video samples is calculated upon the basis of a range of allowed values or a list of allowed values, the range of allowed values or the list of allowed values being determined by the first value of the first video sample and the second value of the second video sample of the extracted plurality of video samples. Thus, the calculation of the correction offset can be simplified.

The range of allowed values (RAV) can be characterized by a minimum value and a maximum value. The range of allowed values can comprise a continuous set of values.

The list of allowed values (LAV) can be characterized by a set of discrete values extracted from the range of allowed values.

In a ninth implementation form of the method according to the first aspect as such or any of the preceding implementation forms of the first aspect, the correction offset for the first video sample of the extracted plurality of video samples is calculated upon the basis of a range of allowed values or a list of allowed values, the range of allowed values or the list of allowed values being determined upon the basis of a soft scheme, a hard scheme, a linear interpolation scheme, a cubic interpolation scheme, or a filtering scheme using the extracted plurality of video samples. Thus, the calculation of the correction offset can be simplified.

The soft scheme can be characterized by determining the maximum value of the extracted plurality of video samples and the minimum value of the extracted plurality of video samples, adding a first constant value to the minimum value, subtracting a second constant value from the maximum value, and defining the resulting range as range of allowed values.

The hard scheme can be characterized by determining the maximum value of the extracted plurality of video samples and the minimum value of the extracted plurality of video samples, determining an approximating line through the minimum value and the maximum value, and defining the resulting range between the first value of the first video sample and the value of the approximating line at the first video sample as range of allowed values.

The linear interpolation scheme can be characterized by determining a linear interpolation line based on the values of the extracted plurality of video samples, and defining the resulting range between the first value of the first video sample and the value of the linear interpolation line at the first video sample as range of allowed values.

The cubic interpolation scheme can be characterized by determining a cubic interpolation curve based on the values of the extracted plurality of video samples, and defining the resulting range between the first value of the first video sample and the value of the cubic interpolation curve at the first video sample as range of allowed values.

The filtering scheme can be characterized by determining a filtered curve based on the values of the extracted plurality of video samples, and defining the resulting range between the first value of the first video sample and the value of the filtered curve at the first video sample as range of allowed values.

In a tenth implementation form of the method according to the eighth implementation form of the method or the ninth implementation form of the method, the correction offset for the first video sample of the extracted plurality of video samples is calculated as a maximum offset between the first value of the first video sample and a plurality of allowed values defined by the range of allowed values or the list of allowed values. Thus, the calculation of the correction offset can be simplified.

In an eleventh implementation form of the method according to the first aspect as such or any of the preceding implementation forms of the first aspect, the method comprises determining intensity offset values for edge offset categories.

In an twelfth implementation form of the method according to the first aspect as such or any of the preceding implementation forms of the first aspect, the method comprises calculating a range or a list of offset values, in particular allowed offset values, for each of the video samples of the plurality of video samples.

In an thirteenth implementation form of the method according to the first aspect as such or any of the preceding implementation forms of the first aspect, the method comprises adaptively correcting video samples of the plurality of video samples with the correction offset that is determined by adapting offset value to the range or the list of allowed offset values.

According to a second aspect, the invention relates to an apparatus for adaptively processing video samples in a video signal frame, the video samples being arranged in a Largest Coding Unit, the apparatus comprising: a processor being configured to extract a plurality of video samples from the Largest Coding Unit, the processor being configured to calculate a correction offset for a first video sample of the extracted plurality of video samples upon the basis of a first value of the first video sample and a second value of a second video sample of the extracted plurality of video samples, and the processor being configured to weight the first video sample with the correction offset. Thus, the method for adaptively processing video samples in a video signal frame can be performed efficiently.

The processor can be configured to execute a computer program.

The apparatus can be configured to perform the method according to the first aspect as such or any of the implementation forms of the first aspect.

Further features of the apparatus can result from the functionality of the method according to the first aspect as such or any of the implementation forms of the first aspect.

In a first implementation form of the apparatus according to the second aspect, the processor is further configured to assign an edge offset class to the extracted plurality of video samples, the edge offset class indicating a directional pattern of the extracted plurality of video samples, and the processor is further configured to select an edge offset category from a plurality of edge offset categories for the extracted plurality of video samples, the edge offset category characterizing an alignment of the extracted video samples with respect to each other, the plurality of edge offset categories being assigned to the edge offset class. Thus, the method can be performed using an optimized edge offset class and/or an optimized edge offset category.

In a second implementation form of the apparatus according to the first implementation form of the apparatus, the processor is further configured to perform a rate distortion optimization procedure for assigning the edge offset class or selecting the edge offset category, the rate distortion optimization procedure using a distortion look-up table for assigning the edge offset class or selecting the edge offset category. Thus, an optimized assignment of the edge offset class and an optimized selection of the edge offset category can be achieved.

According to a third aspect, the invention relates to a computer program for performing the method according to the first aspect as such or any of the implementation forms of the first aspect when executed on a computer. Thus, the method can be performed efficiently and repeatably.

The computer program can be provided in form of a machine-readable code. The computer program can comprise a series of commands for a processor of a computer.

The computer can comprise a processor, a memory, and/or input/output means.

The computer program can be configured to perform the method according to the first aspect as such or any of the implementation forms of the first aspect.

Further features of the computer program can result from the functionality of the method according to the first aspect as such or any of the implementation forms of the first aspect.

The invention can be implemented in hardware and/or software.

BRIEF DESCRIPTION OF THE DRAWINGS

Further embodiments of the invention are described with respect to the following figures, in which.

DETAILED DESCRIPTION

Figure 1:
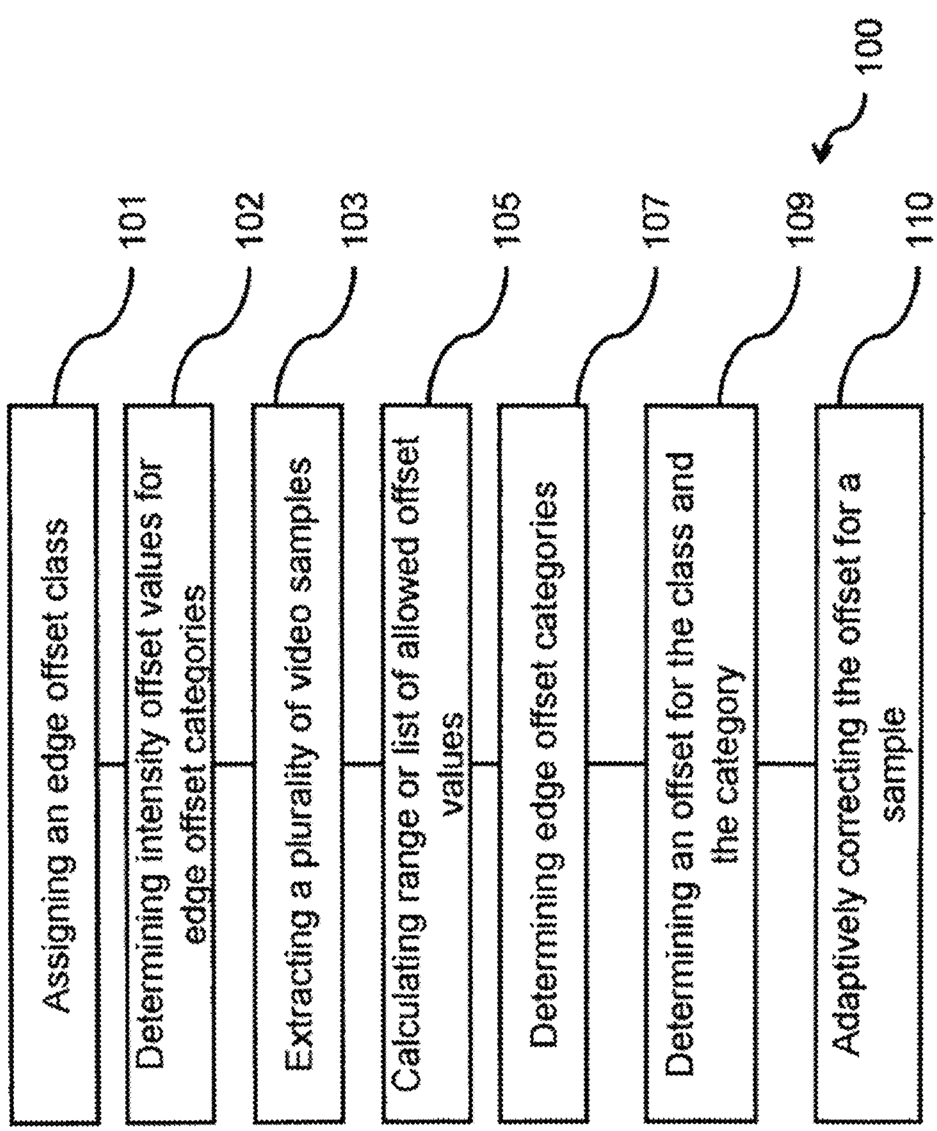
FIG. 1 shows a schematic diagram of a method for adaptively processing video samples in a video signal frame.

FIG. 1 shows a schematic diagram of a method 100 for adaptively processing video samples in a video signal frame. The video samples can be arranged in a Largest Coding Unit.

The method 100 can comprise assigning 101 an edge offset class to the extracted plurality of video samples, the edge offset class indicating a directional pattern of the extracted plurality of video samples, extracting 103 a plurality of video samples from the Largest Coding Unit, selecting 105 an edge offset category from a plurality of edge offset categories for the extracted plurality of video samples, the edge offset category characterizing an alignment of the extracted video samples with respect to each other, the plurality of edge offset categories being assigned to the edge offset class; calculating 107 a correction offset for a first video sample of the extracted plurality of video samples upon the basis of a first value of the first video sample and a second value of a second video sample of the extracted plurality of video samples. Hereby, an edge offset category for each of video samples of the plurality of video samples can be determined.

The method further comprises weighting 109 the first video sample with the correction offset. Hereby, adaptively correcting video samples of the plurality of video samples with the correction offset that is determined by adapting offset value to the range or the list of allowed offset values can be performed.

The method can further comprise determining intensity offset values for edge offset categories between the steps 101 and 103.

The method can further comprise calculating a range or list of allowed offset values for each of the video samples of the plurality of video samples between the steps 103 and 107.

Figure 2:
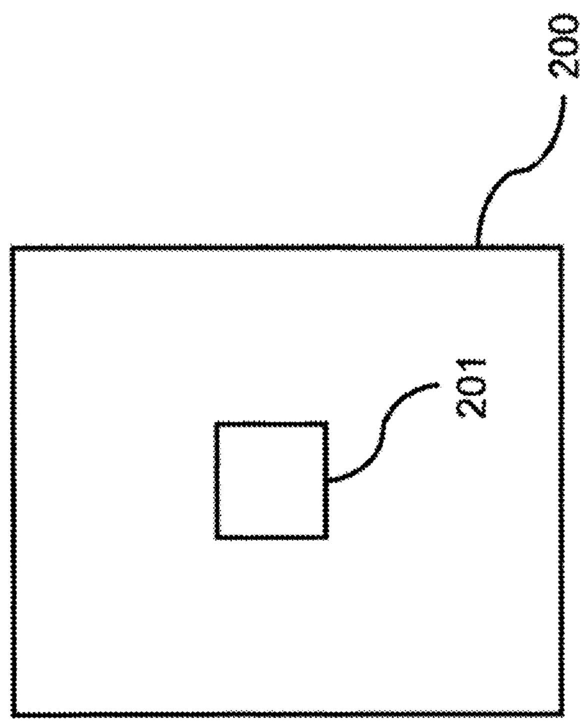
FIG. 2 shows a schematic diagram of an apparatus for adaptively processing video samples in a video signal frame.

FIG. 2 shows a schematic diagram of an apparatus 200 for adaptively processing video samples in a video signal frame. The video samples can be arranged in a Largest Coding Unit.

The apparatus 200 can comprise a processor 201 being configured to extract a plurality of video samples from the Largest Coding Unit, the processor 201 being configured to calculate a correction offset for a first video sample of the extracted plurality of video samples upon the basis of a first value of the first video sample and a second value of a second video sample of the extracted plurality of video samples, and the processor 201 being configured to weight the first video sample with the correction offset.

The processor 201 can further be configured to assign an edge offset class to the extracted plurality of video samples, the edge offset class indicating a directional pattern of the extracted plurality of video samples, and the processor 201 can further be configured to select an edge offset category from a plurality of edge offset categories for the extracted plurality of video samples, the edge offset category characterizing an alignment of the extracted video samples with respect to each other, the plurality of edge offset categories being assigned to the edge offset class.

The processor 201 can further be configured to perform a rate distortion optimization procedure for assigning the edge offset class or selecting the edge offset category, the rate distortion optimization procedure using a distortion look-up table for assigning the edge offset class or selecting the edge offset category.

The processor 201 can further be configured to execute a computer program.

Figure 3:
FIG. 3 shows a schematic diagram of a Largest Coding Unit based sample adaptive offset coding scheme.
Figure 3:
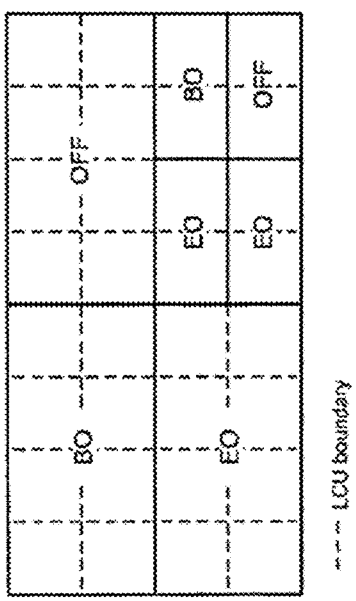

FIG. 3 shows a schematic diagram 300 of a Largest Coding Unit based sample adaptive offset coding scheme.

The idea of sample adaptive offset (SAO) is to compensate for the errors directly using an offset that is added to or subtracted from the values of selected pixels or video samples, and classification as a mechanism to select such pixels or video samples that the offset is applied to. SAO comprises two types of offsets: edge offset (EO) and band offset (BO). These types are referred to as SAO types as well.

In the case of EO, the video sample classification is based on comparison between current video samples and neighboring video samples. In the case of BO, the video sample classification is based on video sample values. BO implies one offset is added to all video samples of the same band. For example in the final version of the H.265/HEVC standard, SAO can be Largest Coding Unit (LCU) based. It means that the SAO parameters can be calculated for each LCU, which can be encoded using either EO or BO. If the both SAO types are not profitable in the terms of rate distortion theory or RD-theory, SAO can be switched off.

SAO can be considered as an in-loop filter that is placed after the ADF. The invention relates mainly to EO.

On the encoder side for pictures or video frames placed in a decoded picture buffer (DPB) and on the decoder side, the resulted magnitude of a pixel or video sample changed by SAO is calculated using the following formula:

$$p_{SAO} = p + \Delta_{SAO}$$

wherein p denotes the magnitude of the pixel or video sample before the SAO filter, and $\Delta_{SAO}$ denotes the offset value.

Figure 4:
FIG. 4 shows a schematic diagram of four 1-dimensional directional patterns for edge offset video sample classification.
Figure 4:
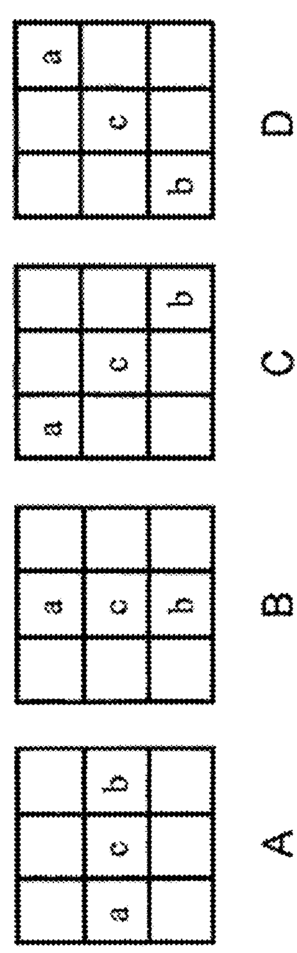

FIG. 4 shows a schematic diagram 400 of four 1-dimensional directional patterns for edge offset video sample classification.

The directional pattern A relates to a horizontal directional pattern (EO class=0). The directional pattern B relates to a vertical directional pattern (EO class=1). The directional pattern C relates to a 135° diagonal directional pattern (EO class=2). The directional pattern D relates to a 45° diagonal directional pattern (EO class=3).

Initially, 2-dimensional patterns have been proposed to be used for the classification of pixels or video samples. However, such a classification may be computationally intensive. In order to keep a reasonable balance between complexity and coding efficiency, EO can use four 1-dimensional directional patterns for video sample classification: horizontal, vertical, 135° diagonal, and 45° diagonal, wherein the label "c" represents a current video sample and the labels "a" and "b" represent two neighboring video samples. According to these directional patterns, four EO classes can be specified, and each EO class can correspond to one directional pattern.

On the encoder side, one EO class may be selected for each LCU that enables EO. Based on rate distortion optimization (RDO), the best EO class can be embedded or sent in the bitstream as side information. For a given EO class, each video sample inside the LCU can be classified into one of five categories.

Figure 5:
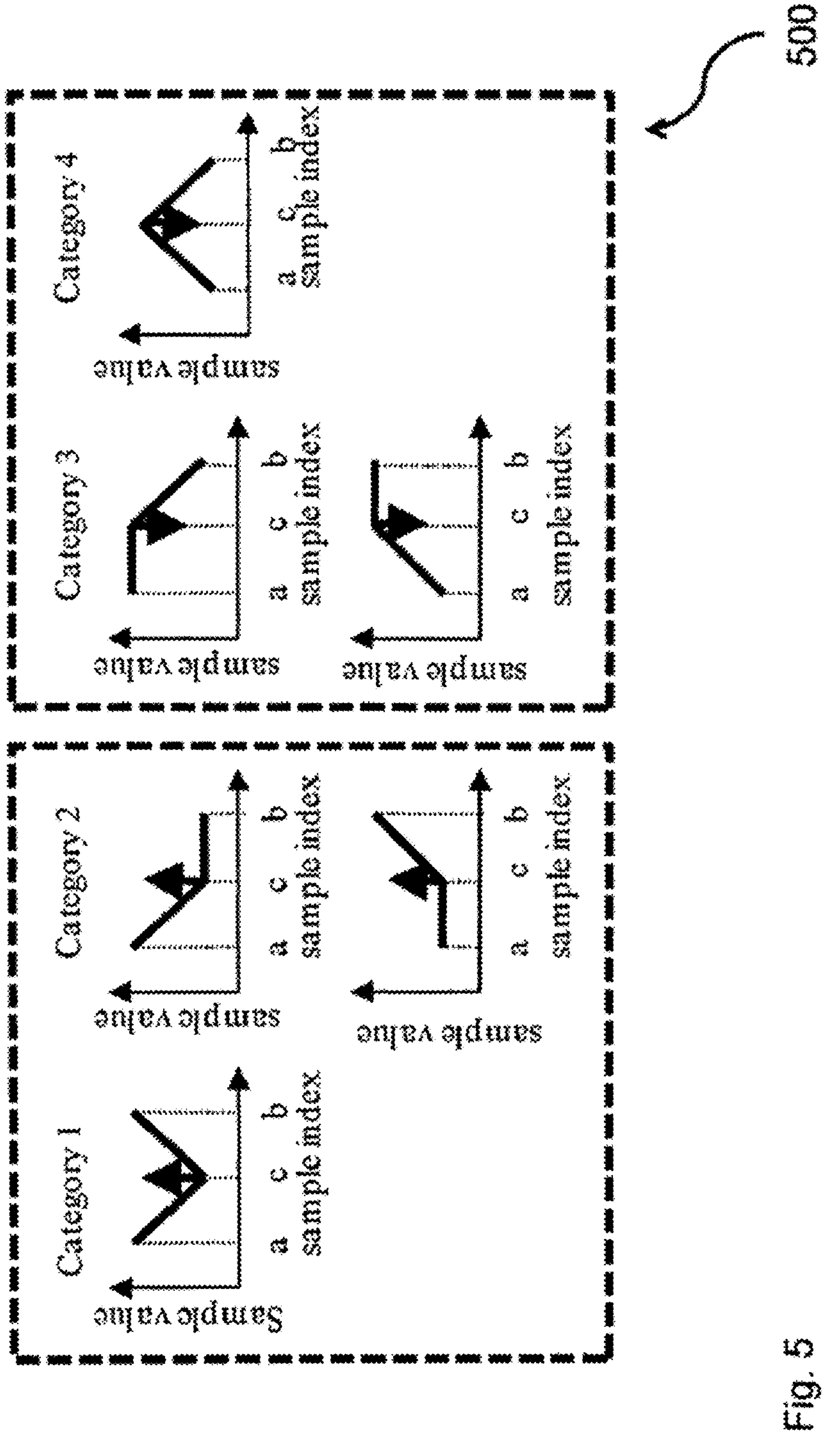
FIG. 5 shows a schematic diagram of four edge offset categories.

FIG. 5 shows a schematic diagram 500 of four edge offset categories.

The current video sample value, labeled as "c", can be compared with its two neighbors along the selected 1-dimensional pattern. Categories 1 and 4 are associated with a local valley and a local peak along the selected 1-dimensional pattern, respectively. Categories 2 and 3 are associated with concave and convex corners along the selected 1-dimensional pattern, respectively.

In contrast to BO offsets the sign of which is explicitly written, the sign of EO offsets can be implicitly defined using their categories, namely: for EO categories 1 and 2, the offset can be positive, i.e. can be more than zero, and for EO categories 3 and 4, the offset can be negative, i.e. can be less than zero. If the current video sample does not belong to EO categories 1 to 4, then it can belong to category 0 and EO may not be applied to this video sample.

Figure 6:
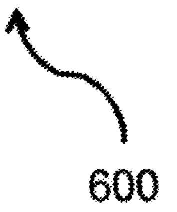
FIG. 6 shows a table comprising mathematical definitions of edge offset categories.

FIG. 6 shows a table 600 comprising mathematical definitions of edge offset categories.

The mathematical definition relates to the edge offset categories shown in FIG. 5.

Figure 7:
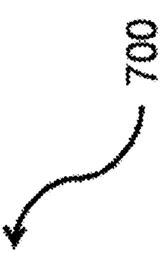
FIG. 7 shows a schematic diagram of four 1-dimensional directional patterns for edge offset video sample classification comprising five samples.
Figure 7:
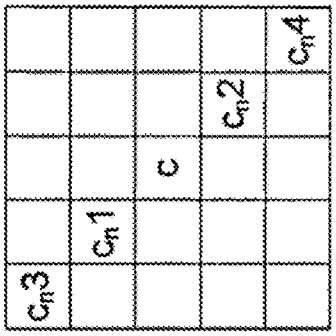

FIG. 7 shows a schematic diagram 700 of four 1-dimensional directional patterns for edge offset video sample classification comprising five video samples.

In emerging video coding standards, e.g. the main profile of the H.265/HEVC standard, SAO may use a directional pattern comprising 3 video samples, i.e. the length of each directional pattern is equal to 3. The number of video samples in the 1-dimensional directional patterns can also be increased, e.g. to 5 video samples.

Figure 8:
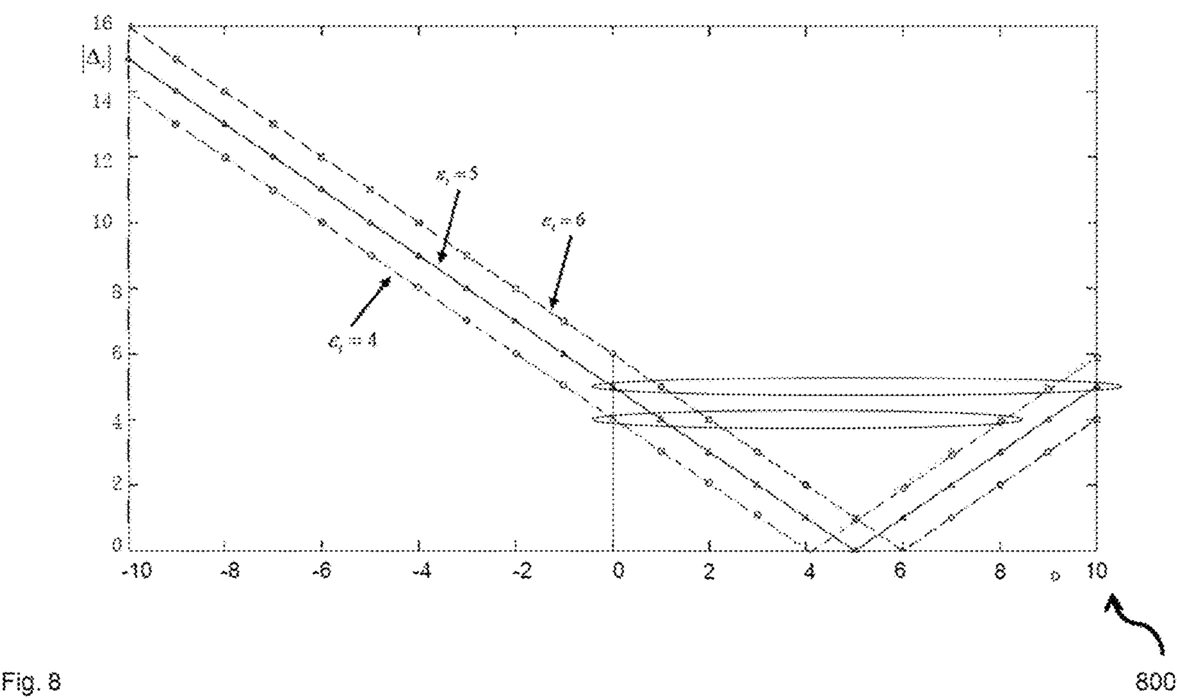
FIG. 8 shows a schematic diagram of the final error after a sample adaptive offset filter.

FIG. 8 shows a schematic diagram 800 of the final error after a sample adaptive offset filter. The final error is depicted for the $i^{th}$ pixel or video sample after the SAO filter for different EO offset values and the pixel's or video sample's errors before the SAO filter. $|\Delta_i|$, denotes the absolute value of $\Delta_i$.

The idea of EO is to recognize extreme video samples by a fixed classifier comparing each video sample with its neighbors and correct those extreme video samples without explicitly signaling their location. In general, there may be a difference between the value $v_{EO}(j)$ of EO offset for the $j^{th}$ category and error $\varepsilon_i$ for the $i^{th}$ pixel or video sample before the SAO filter:

$$\Delta_i(j) = \varepsilon_i - v_{EO}(j)$$

Evidently, the quality improvement for the $i^{th}$ pixel or video sample is maximal if $\Delta_i(j)=0$. It means that the final error of the $i^{th}$ pixel or video sample after the SAO filter is equal to 0. In diagram 800, the dependence of the final error of the $i^{th}$ pixel or video sample after the SAO filter on $\varepsilon_i$ and $v_{EO}$ is presented. It shows the fact that the final error of the $i^{th}$ pixel or video sample after applying an EO offset to the pixel or video sample can increase or become more. Hence, it may be reasonable to adaptively restrict the value of the EO offset in order to avoid increasing the final error.

Moreover, pixels or video samples belonging to the same EO class and EO category can have different values of $\varepsilon_i$. In the case of the casual SAO filter, the EO offset can be constant for all the pixels or video samples belonging to the same EO class and EO category. There are currently no mechanisms that allow to individually change the value of the EO offset for each pixel or video sample belonging to the same EO class and EO category.

In an implementation form, there can be a difference between the values of SAO offset and real errors for pixels or video samples according to:

$$\Delta_i = |v_{SAO} - \varepsilon_i|$$

wherein $v_{SAO}$ is the value of the SAO offset and $\varepsilon_i$ is the value of a real error for pixel i belonging to a given category.

In an implementation form, the following inequality should be correct in order to achieve a coding gain:

$$\sum_{i=0}^{N-1} \Delta_i^2 < \sum_{i=0}^{N-1} \varepsilon_i^2$$

wherein N is the number of pixels or video samples belonging to the given category.

In an implementation form, pixels or video samples with larger errors (e.g. 3, 4, 5, etc.) can impact the total distortion considerably more than pixels or video samples with lower errors (e.g. 1 or 2) due to the quadratic degree used in the inequality.

In an implementation form, the invention is based on the idea to maximize the offset value in order to minimize larger errors and to adaptively cut off the offset value for pixels or video samples with lower errors using the value of neighboring pixels or video samples and further information.

Figure 9:
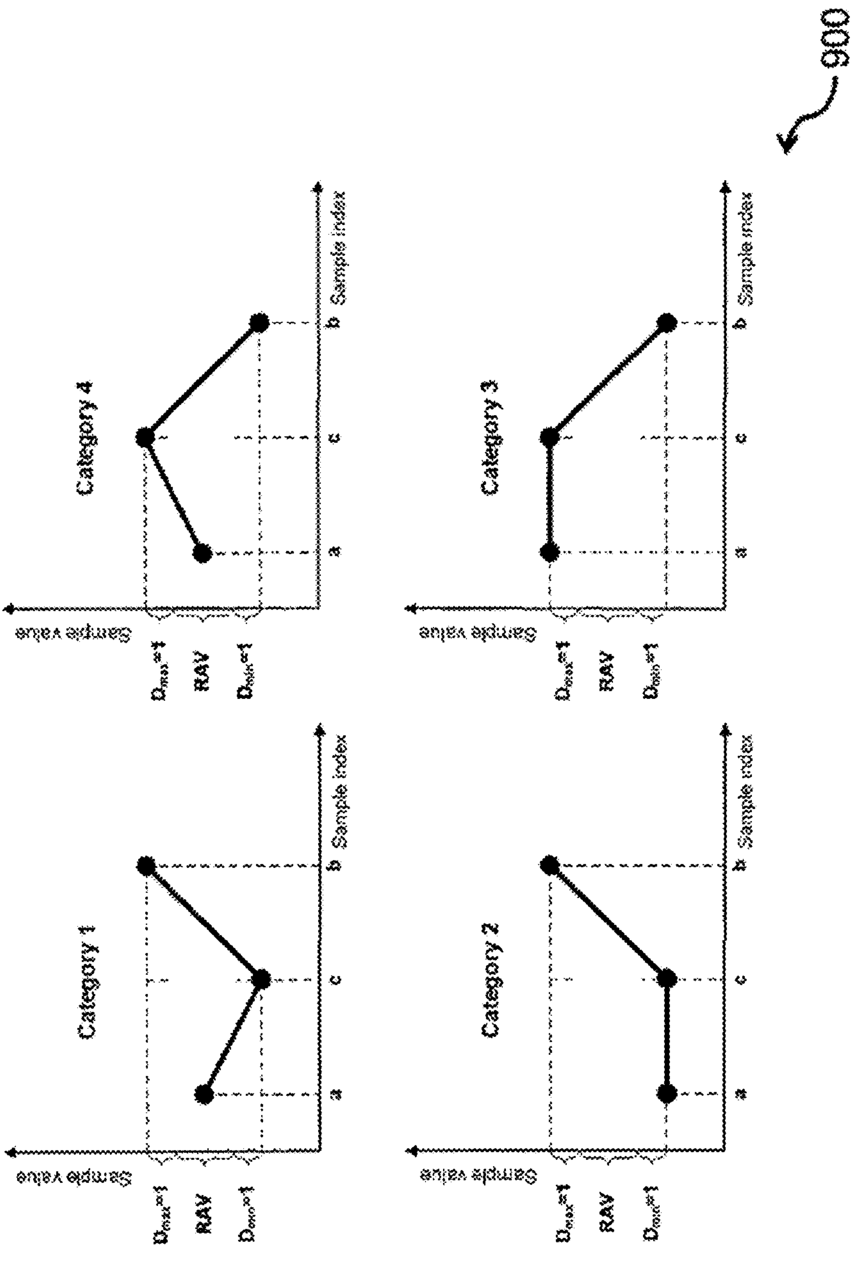
FIG. 9 shows a schematic diagram of a soft scheme for the adaptation of the value of a pixel or video sample while applying an edge offset.

FIG. 9 shows a schematic diagram 900 of a soft scheme for the adaptation of the value of a pixel or video sample while applying an edge offset.

Figure 10:
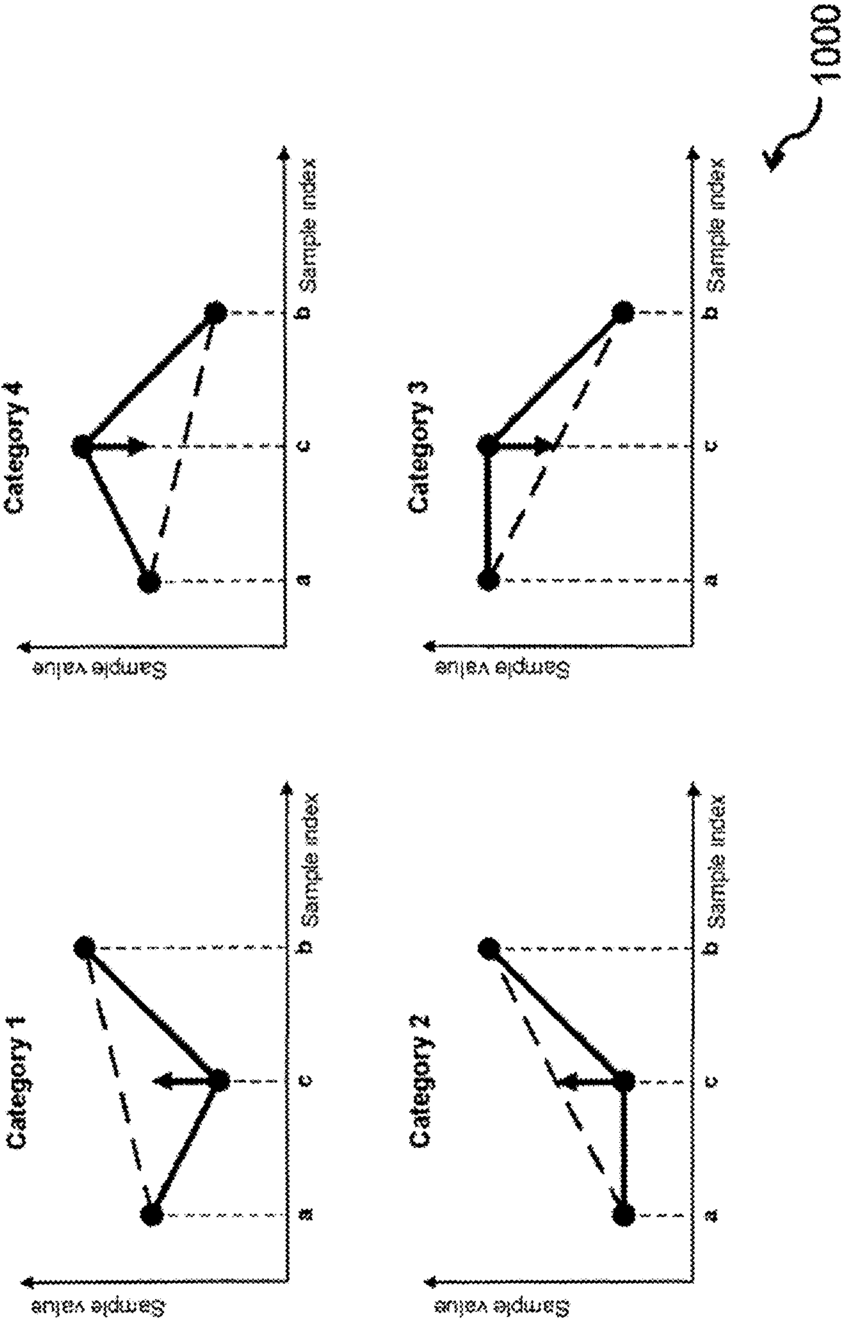
FIG. 10 shows a schematic diagram of a hard scheme for the adaptation of the value of a pixel or video sample while applying an edge offset.

FIG. 10 shows a schematic diagram 1000 of a hard scheme for the adaptation of the value of a pixel or video sample while applying an edge offset.

Figure 11:
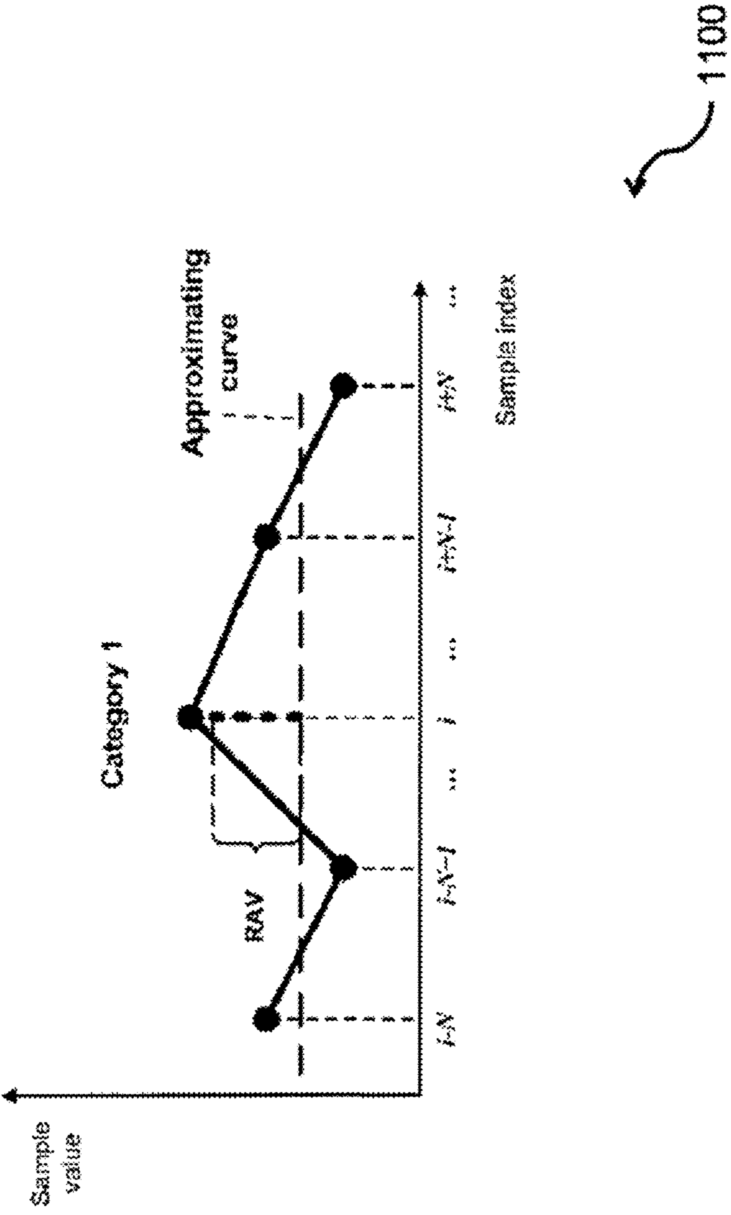
FIG. 11 shows a schematic diagram of a linear interpolation scheme for five-sample edge offset patterns.

FIG. 11 shows a schematic diagram 1100 of a linear interpolation scheme for five-sample edge offset patterns.

Figure 12:
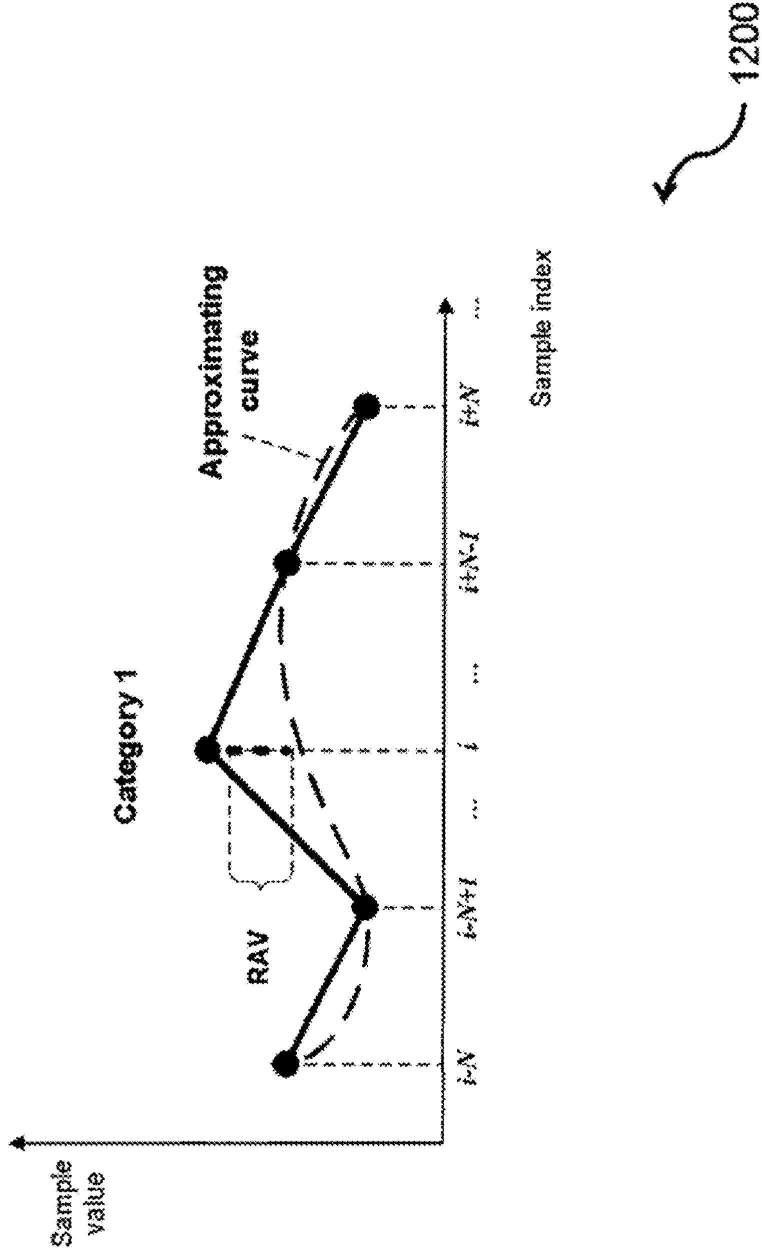
FIG. 12 shows a schematic diagram of a cubic interpolation scheme for five-sample edge offset patterns.

FIG. 12 shows a schematic diagram 1200 of a cubic interpolation scheme for five-sample edge offset patterns.

Figure 13:
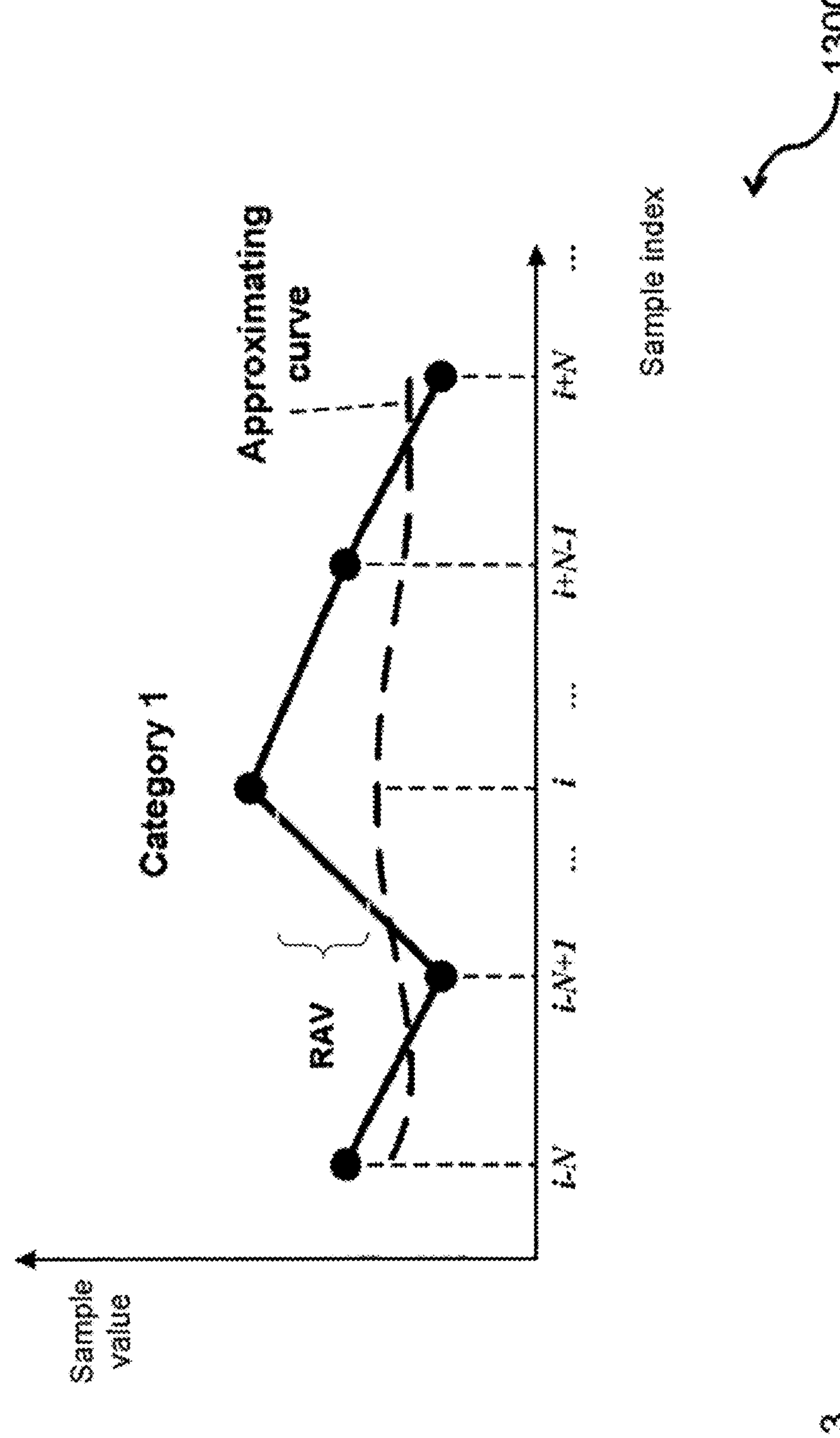
FIG. 13 shows a schematic diagram of a filtering scheme for five-sample edge offset patterns.

FIG. 13 shows a schematic diagram 1300 of a filtering scheme for five-sample edge offset patterns.

The basic idea of the invention is to provide adaptation mechanisms that will provide either a range of allowed values (RAV) or a list of allowed values (LAV) for a pixel or video sample under consideration while applying an EO offset to it. In general, this range or this list can be defined using the magnitudes of the pixel or video sample under consideration and its neighboring pixels or video samples and their location relative to each other. There are different ways to realize it. In particular, two ways are presented in FIG. 9 and FIG. 10, respectively.

In the case shown in FIG. 9, the final value of a pixel or video sample should be located in the range marked by the RAV line. The range, e.g. its maximum and minimum values, depends on the magnitude of the pixel or video sample under consideration and its two neighboring pixels or video samples. All the three pixels or video samples belong to the same EO pattern. This variant is called soft scheme.

In an implementation form, it is possible to implicitly individualize the process of applying to each pixel or video sample. A range of allowed values (RAV) for the pixel or video sample C can be calculated subject to the values of its neighbors A and B.

In the case shown in FIG. 10, linear interpolation is used to restrict the range of the values that can be assigned to the pixel or video sample under consideration. In this case, the final video sample value may not be more than the value defined by the dashed line for EO categories 1 and 2 and it may not be less than the value defined by the dashed line for EO categories 3 and 4. This variant is called hard scheme.

In an implementation form, the dotted line should not be crossed after applying an offset to a pixel or video sample value. Therefore, it is desirable to correct the value received after applying an offset to it. This variant can represent one of many possible cut-off functions. A softer solution can be to cut off the new values of pixels or video samples if these values are out of RAV.

It is notable that other variants of defining a range or a list of the allowed values for a pixel or video sample under consideration exist while applying an EO offset to it. For example, it is possible to define the minimum and maximum value of the range of allowed values (RAV).

In some situations, in order to reduce the computational complexity of the RDO procedure, it is reasonable to introduce an additional parameter that defines the iteration step $v_{step}$, i.e. EO offset may not take all the values belonging to the RAV but those values that are multiples of the step $v_{step}$:

$$\{P_{min}, P_{min}+v_{step}, P_{min}+2v_{step}, P_{min}+3v_{step}, \ldots, P_{max}\}$$

In this case, the RAV is transformed to a list of allowed values (LAV).

Taking into account the variants with increased length of EO patterns, further variants of defining the RAV and the LAV can be used, as shown in FIG. 11, FIG. 12 and FIG. 13.

Figure 14:
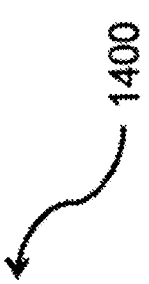
FIG. 14 shows a schematic diagram of allowed transitions from an edge offset category to another edge offset category.
Figure 14:
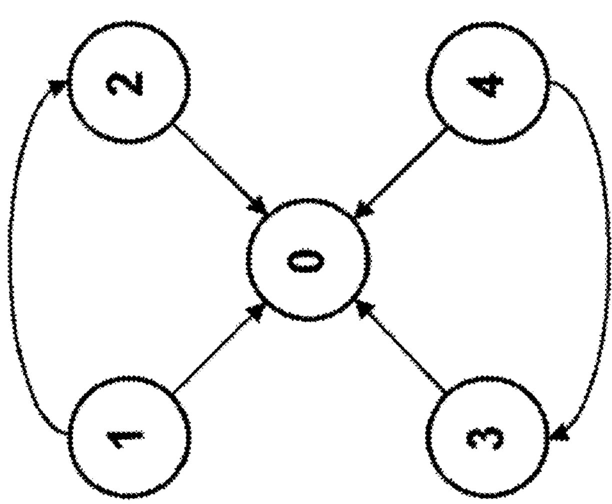

FIG. 14 shows a schematic diagram 1400 of allowed transitions from an edge offset category to another edge offset category.

The basic idea of the invention is to restrict the transitions from one edge offset category to another edge offset category. The allowed transitions can comprise: 1 to 0, 1 to 2, 2 to 0, 3 to 0, 4 to 0, and 4 to 3. The forbidden transitions can comprise: 1 to 3, 1 to 4, 2 to 1, 2 to 3, 2 to 4, 3 to 1, 3 to 2, 3 to 4, 4 to 1, and 4 to 2.

Figure 15:
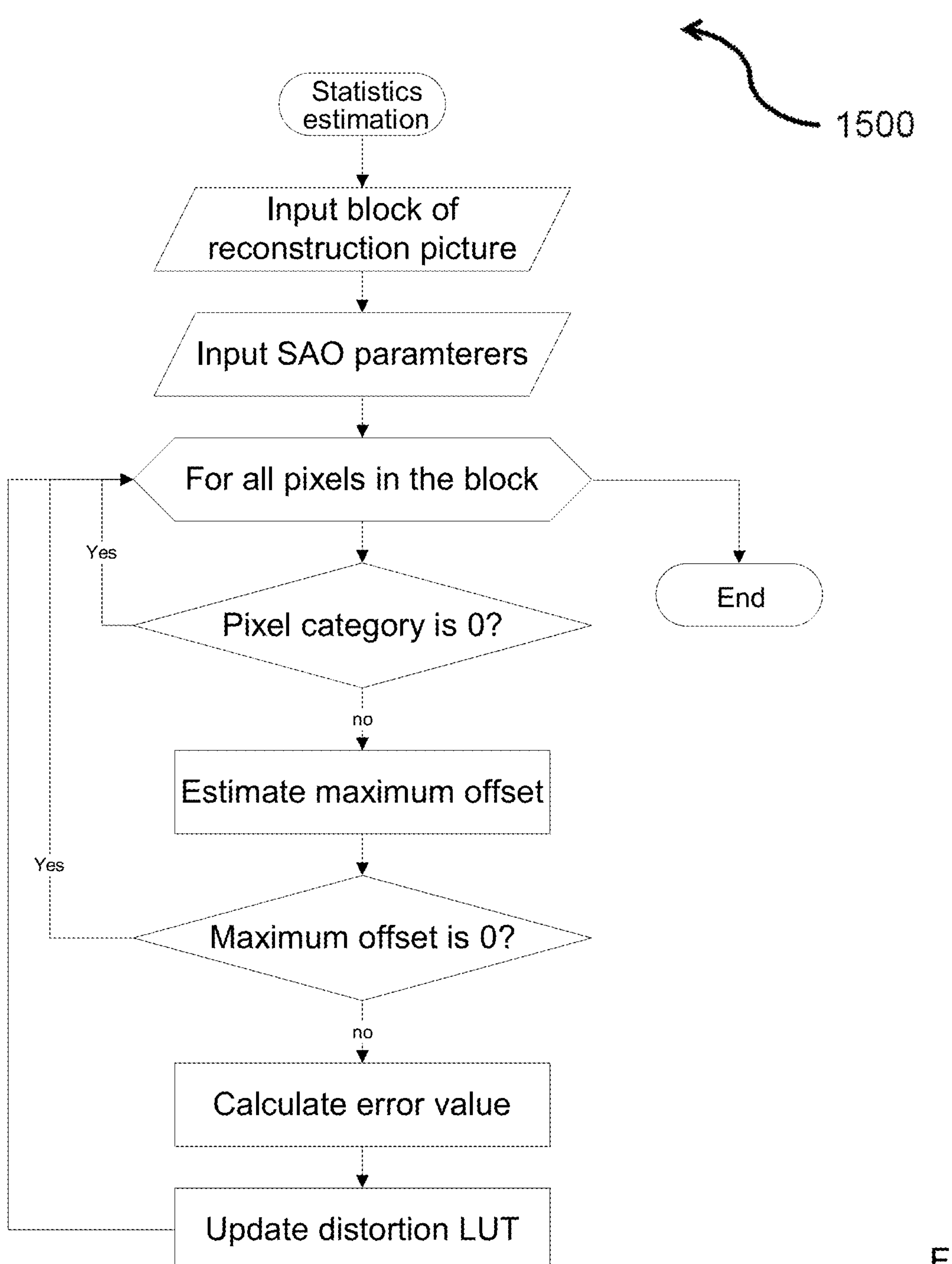
FIG. 15 shows a schematic diagram of a statistics estimation of a rate distortion optimization procedure.

FIG. 15 shows a schematic diagram 1500 of a statistics estimation of a rate distortion optimization procedure.

To achieve a high coding gain, a special rate distortion optimization (RDO) procedure can be used to select such SAO parameters that provide the lowest rate distortion cost (RDC). The SAO parameters can contain the following data: SAO types, EO class in the case if EO is selected, offset values comprising absolute values of EO offset for each EO category if EO is selected, wherein in this case, the sign of the offset can be defined using EO category, and offset values for each BO band if BO is selected.

The RDO procedure for SAO comprises, at least, the following steps: 1. Gathering the statistic data for all the EO classes and BO bands; 2. Calculating RDC for different SAO parameters; 3. Selecting such SAO parameters that provide the lowest RDC.

Usually, each RDO process can be computationally very intensive. In order to reduce the computational complexity for SAO, an algorithm for fast distortion calculation can be developed.

In order to provide an efficient implementation of the invention, it is desirable to perform rate distortion optimization (RDO) for a fast and robust mode decision on each LCU. The RDO procedure can comprise the following steps: 1. Statistics estimation; 2. Parameter selection.

The statistics estimation can be performed as depicted in FIG. 15.

Figure 16:
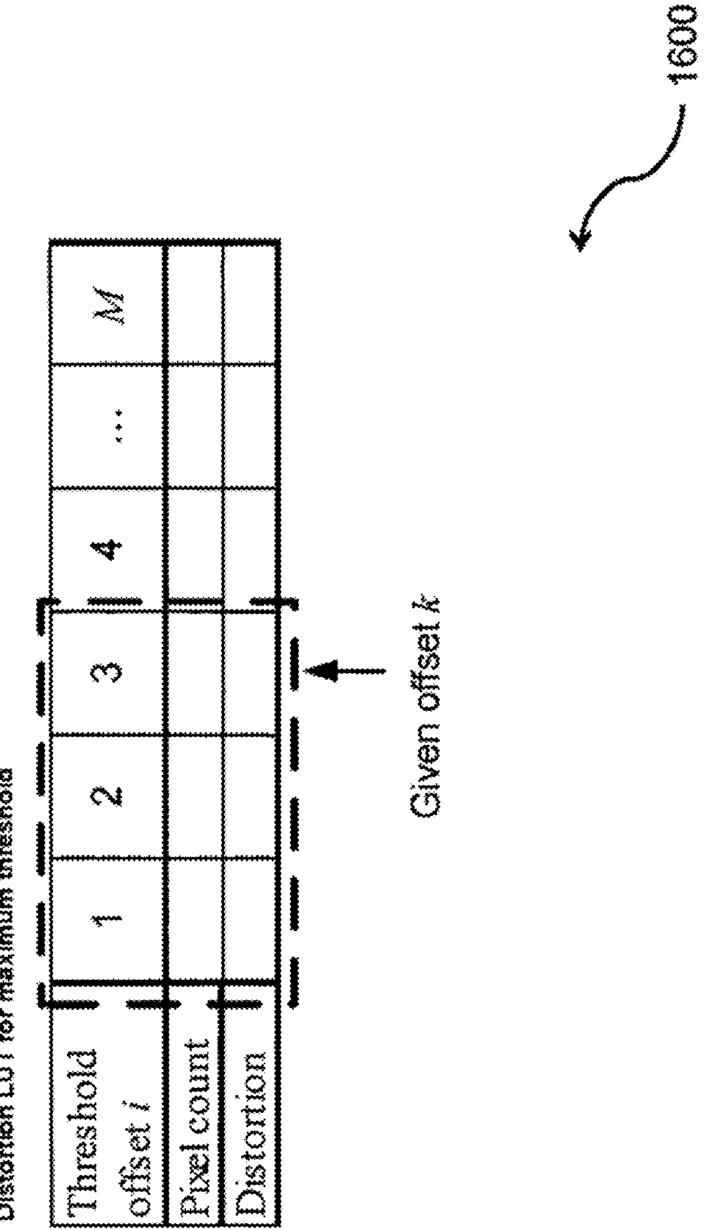
FIG. 16 shows a schematic diagram of a structure of a distortion look-up table.

FIG. 16 shows a schematic diagram 1600 of a structure of a distortion look-up table.

Each pixel or video sample having non-zero category and maximum offset can update the distortion look-up table (distortion LUT). Its structure is depicted in FIG. 16. This table can be indexed by a threshold offset, which can be equal to the absolute value of the maximum offset calculated for the estimated pixel or video sample. Parameters stored for each index of the distortion LUT for the SAO pattern and category can e.g. comprise a pixel count and a total distortion.

Therefore it is possible to apply distortion calculations to calculate distortion for the given threshold offset. Hence, to obtain the total distortion for the offset k, the following equation can be used:

$$D_k = \sum_{i=1}^{k} calcDist(i, d_i, \text{count}_i) + \sum_{i=k+1}^{M} calcDist(k, d_i, \text{count}_i)$$

$d_i$, $\text{count}_i$ are distortion and count values for the threshold offset i, calcDist(offset, d, count) is a distortion function that calculates distortion for the given offset value. M denotes a maximum offset.

The distortion and count values can be calculated according to the following equations:

$$\text{count}_i = \sum 1|_{offset=i}$$

-continued $$d_i = \sum (c_{Org} - c_{Rec})\big|_{offset=i}$$

The selected range in FIG. 16 denotes offsets that are not truncated during distortion calculation, while parameters stored in the non-selected range can be used in the distortion calculation in the context of the constrained offset values.

The parameter selection step of RDO procedure can be performed with the new distortion calculation procedure.

Figure 17:
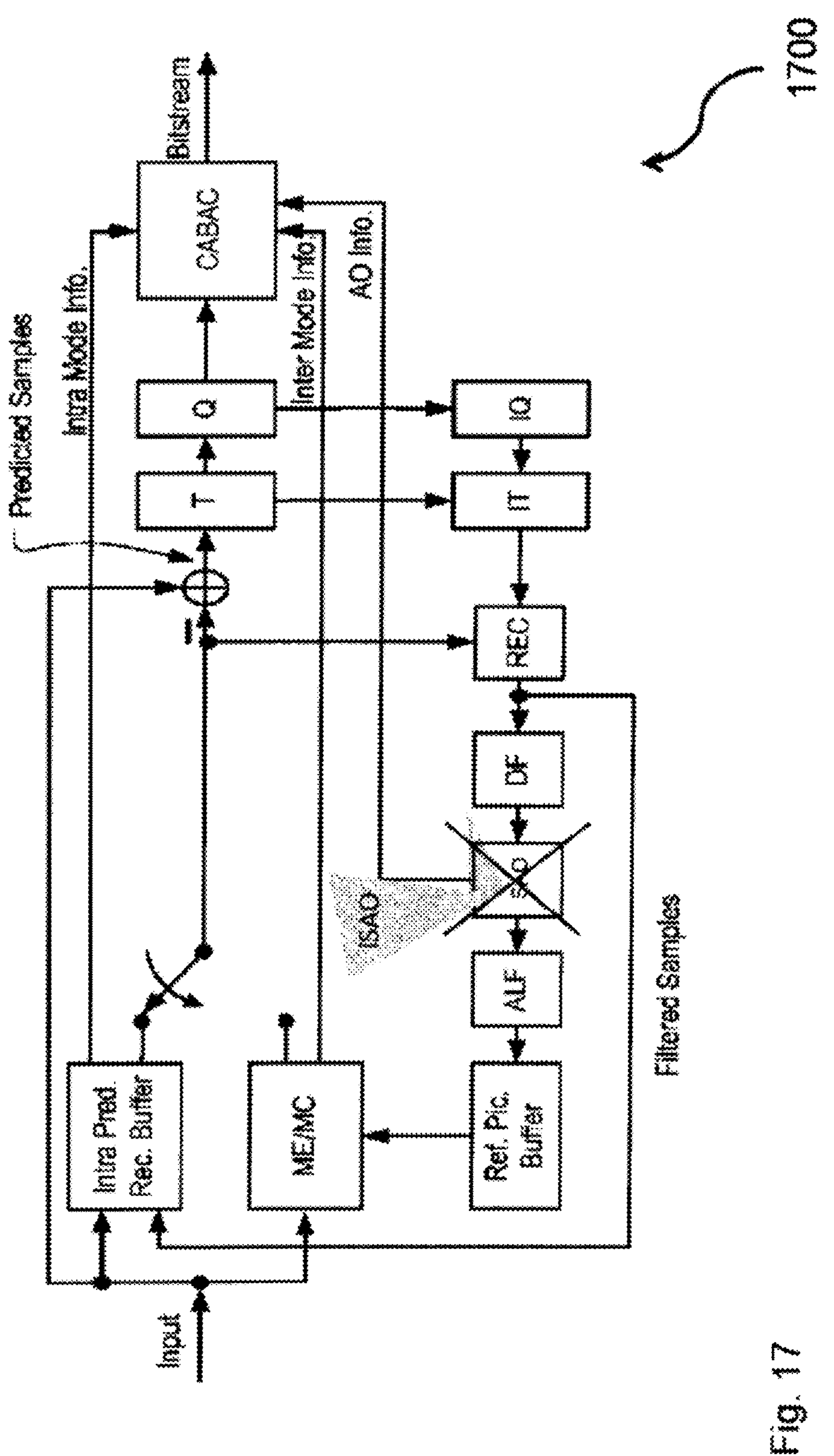
FIG. 17 shows a schematic diagram of an enhanced video decoder.

FIG. 17 shows a schematic diagram 1700 of an enhanced video decoder.

According to an implementation form, an iSAO module can replace a SAO module both in a decoder and encoder, e.g. an HEVC decoder and encoder.

Figure 18:
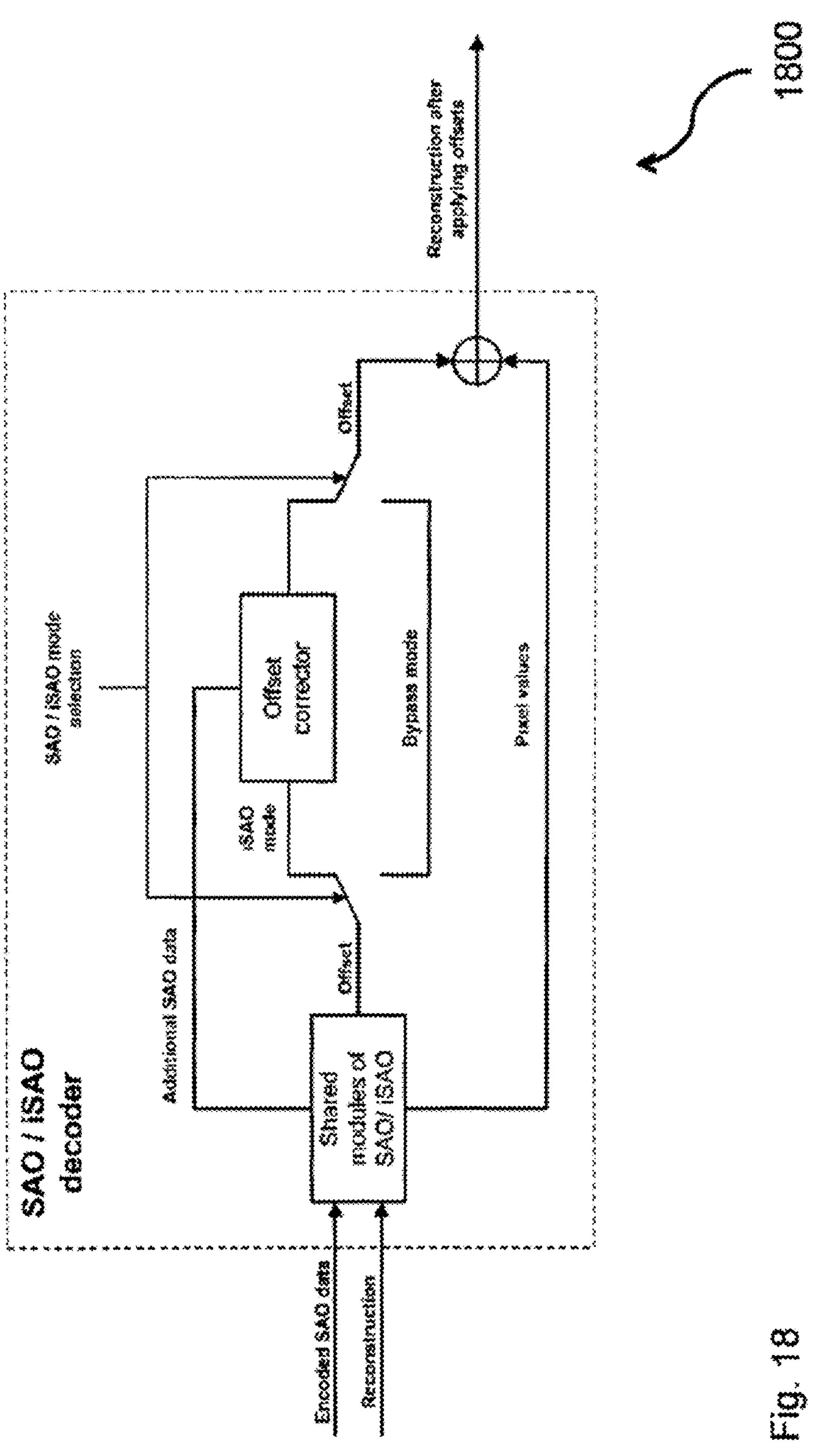
FIG. 18 shows a schematic diagram of a joint decoder.

FIG. 18 shows a schematic diagram 1800 of a decoder, e.g. a joint SAO/iSAO decoder. The iSAO decoder can implement the method for adaptively processing video samples in a video signal frame.

A new module denoted as offset corrector can be introduced. Using a set of data, which is marked as additional SAO data, the offset value can be corrected. The set of data can comprise the values of two neighboring pixels or video samples (A and B), and the value and SAO category of a given pixel or video sample (C).

According to the diagram of the decoder, it can be implemented as a joint SAO/iSAO decoder that can be able to work in two modes. One of the two modes is defined by the SAO/iSAO selection signal. It can control the states of two switches that can either connect the offset corrector to the adder that calculates the new value of a given pixel or video sample, or select a bypass path.

In contrast to an SAO decoder, an SAO encoder can comprise a module for rate distortion optimization (RDO) to calculate such offsets that can provide the highest coding gain. In the case of an iSAO encoder, this module can differ from a corresponding module for casual SAO. The RDO procedure for iSAO can be a generalization of the RDO procedure used in casual SAO. Thus, the iSAO RDO procedure can be used for casual SAO as well.

In contrast to casual SAO, the value of an offset can be adaptively applied to each pixel or video sample. The actual value of the offset can depend on the values of two neighboring pixels or video samples (A and B). Therefore, it is possible to calculate the maximum absolute value of the offset that is not cut off.

A look-up table (LUT), where the number of pixels or video samples and their real distortion can be stored subject to their maximum absolute value of the offset, can be filled in while computing pixel or video sample categories for each pattern. Using this LUT, it is possible to speed up the calculation in the RDO loop. Moreover, the intermediate calculation results from previous stages, e.g. with other offset values, can be stored as well in order to avoid recalculations.

In an implementation form, the invention relates to video coding and in particular to filters used for enhancing pictures or video frames reconstructed after lossy compression.

In an implementation form, the invention adaptively restricts a range or a list of values that can be assigned to a pixel or video sample magnitude after applying an EO offset subject to the magnitudes of neighboring pixels or video samples and their location relative to each other.

In an implementation form, the invention prevents appearing impulse noise, e.g. salt and pepper noise, caused by SAO in decoded pictures or video frames. It therefore allows improving the subjective quality of decoded video sequences.

In an implementation form, an objective coding gain measured as a BD-rate or a Bjøntegaard delta bit rate reduction can be achieved due to removing constraints on the maximum absolute value that can be assigned to EO offsets.

In an implementation form, the method possesses low computational complexity on both the encoder and the decoder sides in comparison with other methods of increasing the coding efficiency of SAO.

In an implementation form, the invention relates to a method for adaptive offset processing of processed video data comprising: receiving the processed video data; selecting a region for the processed video data; specifying class of processing for the region and offset value for the class; and compensating the said region of the processed video data based on the said offset value, that is adaptively corrected for non-zero-class pixels of the said region according to some conditions, e.g. the difference between neighboring pixels.

In an implementation form, adaptive correction is performed using maximum offset calculation.

In an implementation form, adaptive correction is performed using minimum and maximum offsets.

In an implementation form, directional patterns with a length that differs from 3 are used.

In an implementation form, class and offset specification is performed using rate distortion optimization.

In an implementation form, a maximum offset is defined using a hard scheme.

In an implementation form, a maximum offset is defined using a soft scheme.

In an implementation form, pixel or video sample interpolation is used to define a maximum offset.

In an implementation form, the RDO procedure uses a distortion LUT.

In an implementation form, the invention relates to a method and an apparatus for improved sample adaptive offset calculation.

In an implementation form, the invention allows for a reduced BD-rate in comparison with casual SAO.

In an implementation form, the invention can be compatible with casual SAO.

The invention claimed is:

1. A method for adaptively processing video samples in a video signal frame, the method comprising:
- extracting a plurality of video samples from the video signal frame;
- calculating a correction offset for a first video sample of the extracted plurality of video samples, wherein the correction offset is a sample adaptive offset (SAO) comprising an edge offset (EO) having an EO class that includes a EO class 0, a EO class 1, a EO class 2, or a EO class 3;
- adding the correction offset to the first video sample; and
- encoding a syntax element indicating an EO class for the first video sample into a bitstream.

2. The method of claim 1, wherein the EO class 0 indicates a horizontal directional pattern.

3. The method of claim 1, wherein the EO class 1 indicates a vertical directional pattern.

4. The method of claim 1, wherein the EO class 2 indicates a 135° diagonal directional pattern.

5. The method of claim 1, wherein the EO class 3 indicates a 45° diagonal directional pattern.

6. The method of claim 1, wherein the correction offset is calculated upon the basis of a range of allowed values or a list of allowed values.

7. The method of claim 6, wherein the range of allowed values or the list of allowed values is determined upon the basis of a soft scheme, a hard scheme, a linear interpolation scheme, a cubic interpolation scheme, or a filtering scheme using the extracted plurality of video samples.

8. An apparatus for adaptively processing video samples in a video signal frame, the apparatus comprising:

a processor configured to:

extract a plurality of video samples from the video signal frame;

calculate a correction offset for a first video sample of the extracted plurality of video samples, wherein the correction offset is a sample adaptive offset (SAO) comprising an edge offset (EO) having an EO class that includes a EO class 0, a EO class 1, a EO class 2, or a EO class 3;

add the correction offset to the first video sample; and encode a syntax element indicating an EO class for the first video sample into a bitstream.

9. The apparatus of claim 8, wherein the processor is further configured to:

use a look-up table for assigning the EO class or selecting the EO class.

10. The apparatus of claim 8, wherein the EO class 0 indicates a horizontal directional pattern.

11. The apparatus of claim 8, wherein the EO class 1 indicates a vertical directional pattern.

12. The apparatus of claim 8, wherein the EO class 2 indicates a 135° diagonal directional pattern.

13. The apparatus of claim 8, wherein the EO class 3 indicates a 45° diagonal directional pattern.

14. A non-transitory computer-readable medium storing executable instructions that when implemented by a processor, perform a method comprising extracting a plurality of video samples from the video signal frame;

calculating a correction offset for a first video sample of the extracted plurality of video samples, wherein the correction offset is a sample adaptive offset (SAO), wherein the SAO comprises an edge offset (EO); wherein the EO type includes a EO class 0, a EO class 1, a EO class 2 and a EO class 3;

adding the correction offset to the first video sample; and encoding a syntax element indicating an EO class for the first video sample into a bitstream.

15. The non-transitory computer-readable medium of claim 14, wherein the EO class 0 indicates a horizontal directional pattern, the EO class 1 indicates a vertical directional pattern, the EO class 2 indicates a 135° diagonal directional pattern, and the EO class 3 indicates a 45° diagonal directional pattern.

16. The non-transitory computer-readable medium of claim 14, wherein the correction offset for the first video sample of the extracted plurality of video samples is calculated upon the basis of a range of allowed values or a list of allowed values.

17. The non-transitory computer-readable medium of claim 14, wherein the EO class for the first video sample is determined based on the syntax element and a look-up table.

18. The non-transitory computer-readable medium of claim 14, wherein the correction offset is calculated upon the basis of a range of allowed values or a list of allowed values, the range of allowed values or the list of allowed values being determined upon the basis of a soft scheme, a hard scheme, a linear interpolation scheme, a cubic interpolation scheme, or a filtering scheme using the extracted plurality of video samples.

19. The method of claim 1, further comprising assigning or selecting the EO class using a look-up table.

20. The apparatus of claim 8, wherein the correction offset is calculated upon the basis of a range of allowed values or a list of allowed values.

* * * * *